(12) United States Patent
Kameda (10) Patent No.: US 7,417,824 B2
(45) Date of Patent: Aug. 26, 2008

(54) PERPENDICULAR MAGNETIC RECORDING HEAD WHERE MAIN MAGNETIC POLE HAVING INCLINED SURFACE IS FORMED AND METHOD OF MANUFACTURING THE SAME

(75) Inventor: Hiroshi Kameda, Niigata-ken (JP)

(73) Assignee: TDK Corporation, Tokyo (JP)

( * ) Notice: Subject to any disclaimer, the term of this patent is extended or adjusted under 35 U.S.C. 154(b) by 399 days.

(21) Appl. No.: 11/271,261

(22) Filed: Nov. 3, 2005

(65) Prior Publication Data

US 2006/0098340 A1    May 11, 2006

(30) Foreign Application Priority Data

Nov. 10, 2004    (JP)    ............... 2004-326928

(51) Int. Cl.
*G11B 5/147* (2006.01)
(52) U.S. Cl. ................................. 360/125.02
(58) Field of Classification Search ............................... 360/125.02–125.07, 125.16–125.19, 125.2, 360/125.21, 125.22
See application file for complete search history.

(56) References Cited

U.S. PATENT DOCUMENTS 6,501,619 B1    12/2002    Sherrer et al.

2003/0117749 A1    6/2003    Shukh et al.
2004/0233579 A1*   11/2004   Matono ....................... 360/126
2005/0219747 A1*   10/2005   Hsu et al. .................... 360/126
2007/0139818 A1*    6/2007   Shimazawa et al. ......... 360/126
2007/0159719 A1*    7/2007   Yamakawa et al. .......... 360/126

FOREIGN PATENT DOCUMENTS

| JP | A-60-254402 | 12/1985 |
| JP | 2001-101612 | 4/2001 |
| JP | 2003-036503 | 2/2003 |
| JP | 2004-295987 | 10/2004 |

OTHER PUBLICATIONS

Notice of Preliminary Rejection for corresponding Japanese Patent Application Serial No. 2002-380589, dated Apr. 17, 2007.

* cited by examiner

*Primary Examiner*—Allen T Cao
(74) *Attorney, Agent, or Firm*—Brinks Hofer Gilson & Lione (57) ABSTRACT

In the perpendicular magnetic recording head according to the invention, the inclined surface, which is inclined toward the trailing side at the tilt angle θ1 with respect to the virtual vertical line extending from the top surface of the recording medium, is formed in the trailing-side cross section of the main magnetic pole in such a manner that it extends from the front-end surface in a direction where it is spaced apart from the recording medium. If the inclined surface is formed in the main magnetic pole as described above, the absolute value of the magnetic field gradient α1 of the recording magnetic field can be increased and a magnetization inversion width can be decreased. It is thus possible to reduce magnetization inversion noise.

10 Claims, 8 Drawing Sheets

PERPENDICULAR MAGNETIC RECORDING HEAD WHERE MAIN MAGNETIC POLE HAVING INCLINED SURFACE IS FORMED AND METHOD OF MANUFACTURING THE SAME

BACKGROUND OF THE INVENTION

1. Field of the Invention

The present invention relates to a perpendicular magnetic recording head which performs recording by applying a magnetic field onto a recording medium, such as a disk, in a vertical direction. More particularly, the present invention relates to a perpendicular magnetic recording head and a method of manufacturing the same, wherein a magnetization inversion width (a magnetization shift width) among recorded patterns in which magnetization recorded on a recording medium is inversed to one another can be reduced and magnetization inversion noise can be reduced.

2. Description of the Related Art

U.S. Pat. No. 6,501,619 B1 discloses a perpendicular magnetic recording head including a read/write pole serving as a main magnetic pole or a core layer, and a return pole serving as a return yoke layer, wherein a gap layer is formed between the core layer and the return pole, as shown in FIGS. 12 and 16.

In the perpendicular magnetic recording head shown in FIGS. 12 and 16 of U.S. Pat. No. 6,501,619 B1, a recording magnetic field is generated from the read/write pole or the core layer to a data storage layer (that is, a recording medium). The recording magnetic field passes through the data storage layer and then returns to the return pole. If a vertical recording magnetic field is applied from the read/write pole or the core layer, the data storage layer is magnetized in a vertical direction, so that a recording signal is recorded on the data storage layer.

The perpendicular magnetic recording head shown in FIGS. 12 and 16 of U.S. Pat. No. 6,501,619 B1 has a structure in which a surface of the gap layer side of the read/write pole or the core layer is inclined toward the return pole at a predetermined angle with respect to a direction vertical to a top surface of the data storage layer (a surface opposite to the core layer and the return pole).

In the perpendicular magnetic recording head disclosed in U.S. Pat. No. 6,501,619 B1, a recording magnetic field is isotropically spread from the read/write pole or the core layer serving as the main magnetic pole. At this time, as the recording magnetic field becomes wide toward a trailing side or a leading side, the magnetic field strength becomes weak. Upon recording by the perpendicular magnetic recording head, the recording medium moves from the leading side of the perpendicular magnetic recording head to the trailing side. Thus, the recording magnetic field spread toward the trailing side is rewritten on previously recorded patterns (recorded patterns that have been written by a recording magnetic field at the leading side), which have been written on the recording medium. For this reason, the recording magnetic field having the small magnetic field strength, which has been spread on the trailing side, causes a phenomenon that increases a magnetization inversion width (a magnetization shift width) among recorded patterns whose magnetization is inversed to one another. Thus, there is a problem in that magnetization inversion noise caused by the large magnetization inversion width is increased in a reproduction output that is obtained when a reproduction element travels on the recorded patterns. Accordingly, in the perpendicular magnetic recording head, it is necessary to reduce magnetization inversion noise by decreasing the magnetization inversion width.

Such magnetization inversion is generated on the basis of an interface (that is, an isomagnetic interface) where the recording magnetic field strength from the read/write pole or the core layer serving as the main magnetic pole is the same.

The width (an isomagnetic interface width) in a recording medium sliding direction of the isomagnetic interface is related to the magnetization inversion width.

Furthermore, the isomagnetic interface width is related to a magnetic field gradient $\alpha$ of a recording magnetic field. If an absolute value of the recording magnetic field gradient $\alpha$ increases, a magnetization inversion width can be made small. It is thus possible to generate a phenomenon of magnetization inversion noise.

Figure 2:
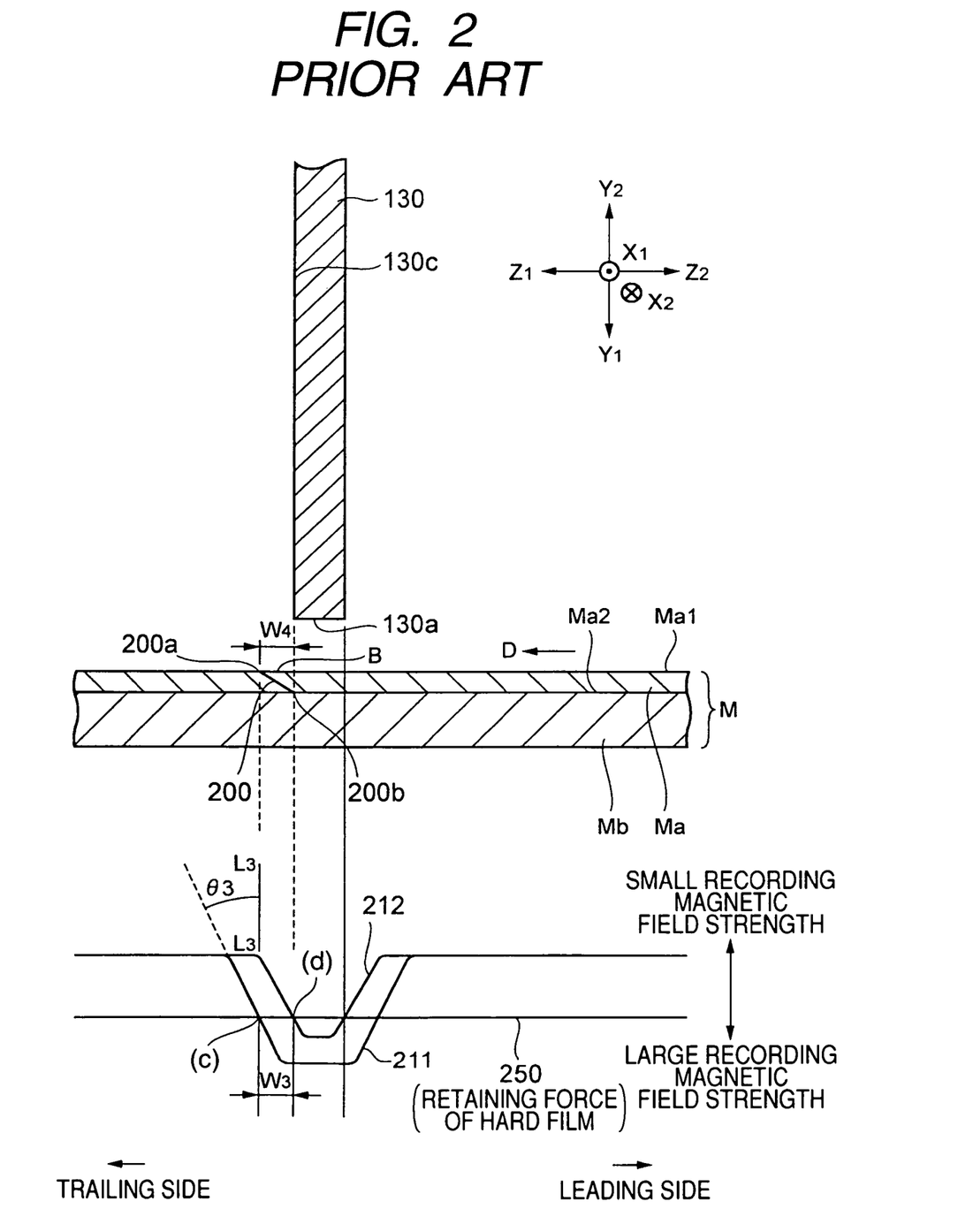
FIG. 2 is a partial longitudinal sectional view of a perpendicular magnetic recording head according to a comparative structure in which a tilt angle θ1 is not formed in a main magnetic pole, and a partial sectional view of a recording medium and a magnetic field strength curve.

In this case, the relationship between the recording magnetic field gradient a and the magnetization inversion width will be described below. FIG. 2 is a diagram illustrating the relationship between a main magnetic pole and a recording medium of a perpendicular magnetic recording head according to a related art, and a location of the main magnetic pole and a recording magnetic field strength generated from the main magnetic pole.

A reference numeral 130 in FIG. 2 indicates the main magnetic pole of the perpendicular magnetic recording head. Magnetic field strength curves 211 and 212 of FIG. 2 show the relationship between the location using the main magnetic pole 130 as a reference and the magnetic field strength of a recording magnetic field (the recording magnetic field strength) which is generated from the main magnetic pole 130, on a top surface Ma1 and a bottom surface Ma2 of a hard film Ma (that is, a recording layer) of a recording medium M. In FIG. 2, the curve 211 indicates the recording magnetic field strength on the top surface Ma1, and the curve 212 indicates the recording magnetic field strength on the bottom surface Ma2.

As shown in FIG. 2, as it approaches the main magnetic pole 130 (toward a direction Z2 in FIG. 2), the recording magnetic field strength on the top surface Ma1 of the hard film Ma gradually increases. The recording magnetic field strength rapidly increases in a region opposite to a trailing-side cross section 130c in a front-end surface 130a of the main magnetic pole 130.

In the same manner, as it approaches the main magnetic pole 130, the recording magnetic field strength on the bottom surface Ma2 of the hard film Ma gradually increases. The recording magnetic field strength rapidly increases in a region opposite to the trailing-side cross section 130c in the front-end surface 130a of the main magnetic pole 130.

Furthermore, the recording magnetic field strength on the top surface Ma1 of the hard film Ma and the recording magnetic field strength on the bottom surface Ma2 of the hard film Ma have the maximum in a region opposite to the front-end surface 130a of the main magnetic pole 130.

Furthermore, as it becomes spaced apart from the main magnetic pole 130 in the direction Z2, the recording magnetic field strength gradually decreases.

A straight line 250 that overlaps the magnetic field strength curves shown in FIG. 2 refers to the amount of coercive force Hc of the hard film Ma constituting the recording medium M. As shown in FIG. 2, in the perpendicular magnetic recording head H, when the recording magnetic field strength is larger than the coercive force Hc of the hard film Ma (that is, the recording layer), magnetization inversion occurs in the hard film Ma. Thus, the hard film Ma is magnetized in a vertical direction and magnetic data is thus recorded on the hard film Ma.

A magnetization inversion width is a distance W3 from the intersection (c) of the recording magnetic field strength curve 211 on the top surface Ma1 and the straight line 250 indicating the coercive force Hc of the hard film Ma to the intersection (d) of the recording magnetic field strength curve 212 on the bottom surface Ma2 and the straight line 250 indicating the coercive force Hc of the hard film Ma in a direction Z1-Z2 (that is, a recording medium sliding direction), in the recording magnetic field strength curves shown in FIG. 2. Magnetization inversion is generated in the region of the hard film Ma having this distance W3. The distance W3 is the magnetization inversion width W3. The region of the hard film Ma having the distance W3 (that is, a region where magnetization inversion is generated) will be referred to as a region B.

An isomagnetic interface 200 exists within the hard film Ma at a location opposite to the region B where magnetization inversion is generated. Accordingly, a distance (the width of the isomagnetic interface) W4 between a top surface 200$a$ and a bottom surface 200$b$ of the isomagnetic interface 200 in the recording medium sliding direction (the direction Z1-Z2 in FIG. 2) is equal to the magnetization inversion width W3.

In FIG. 2, in the case in which the recording magnetic field of the top surface Ma1 within the magnetization inversion width W3 has a tilt angle $\theta 3$ with respect to a virtual vertical line L3-L3 that vertically extends with respect to the top surface Ma1 of the hard film Ma, the magnetization inversion width can be made small by making small the tilt angle $\theta 3$. This can result in the phenomenon of magnetization inversion noise. Further, the tilt angle $\theta 3$ can be made small by increasing the absolute value of the magnetic field gradient $\alpha$ of the recording magnetic field (the recording magnetic field gradient), which is defined as the recording magnetic field strength in a direction vertical to the top surface Ma1 (a direction Y1-Y2 in FIG. 2) that varies per unit distance of the recording medium sliding direction (direction Z1-Z2 in FIG. 2).

In the perpendicular magnetic recording head disclosed in U.S. Pat. No. 6,501,619 B1, if the recording magnetic field from the read/write pole or the core layer serving as the main magnetic pole is inclined toward the trailing side at a predetermined angle with respect to the direction vertical to the recording surface of the recording medium, the tilt angle $\theta 3$ can be made small. Accordingly, the absolute value of the magnetic field gradient $\alpha$ of the recording magnetic field can be increased.

However, FIGS. 12 and 16 of U.S. Pat. No. 6,501,619 B1 do not clearly describe what direction is the trailing side of the perpendicular magnetic recording head. The perpendicular magnetic recording head shown in FIGS. 12 and 16 may not surely make small the magnetization inversion width.

In U.S. Pat. No. 6,501,619 B1, it can be also read that the reason why the surface of the gap layer of the core layer formed in the perpendicular magnetic recording head shown in FIGS. 12 and 16 is inclined is to facilitate film formation.

In FIG. 12 or 16 of U.S. Pat. No. 6,501,619 B1, the surface located at the gap side of the return pole is inclined at a predetermined angle with respect to a direction vertical to the data storage layer, and is thus formed as an inclined surface. In this state, if the gap layer and the read/write pole or the core layer are formed on the inclined surface of the return pole without change, the read/write pole or the core layer can be easily formed. Since the read/write pole or the core layer is laminated on the inclined surface of the return pole, however, the surface located at the gap layer side of the read/write pole or the core layer can be formed to have the same angle as the inclined surface of the return pole. In other words, if the read/write pole or the core layer is laminated on the return pole after the return pole is formed, the read/write pole or the core layer has a shape similar to the shape of the return pole. For this reason, the read/write pole or the core layer is formed to have the tilt angle.

Accordingly, U.S. Pat. No. 6,501,619 B1 never discloses the relationship between a reduction of the tilt angle of the read/write pole or the core layer and a magnetization inversion width or a reduction of magnetization inversion noise. The relationship between them is still unclear.

SUMMARY OF THE INVENTION

Accordingly, the present invention has been finalized in view of the drawbacks inherent in the related art, and it is an object of the present invention to provide a perpendicular magnetic recording head and a method of manufacturing the same, wherein a magnetization inversion width (a magnetization shift width) among recorded patterns in which magnetization recorded on a recording medium is inversed to one another can be decreased and magnetization inversion noise can be reduced.

According to a first aspect of the invention, a perpendicular magnetic recording head includes a main magnetic pole which has a front-end surface opposite to a recording medium on an opposite surface to the recording medium and is made of a magnetic material, and coil layers for applying a recording magnetic field to the main magnetic pole. Further, an inclined surface, which is inclined toward a trailing side at a tilt angle $\theta 1$ with respect to a virtual vertical line extending from a top surface of the recording medium, is formed in a trailing-side cross section of the main magnetic pole, and the inclined surface extends from the front-end surface in a direction where the inclined surface is spaced apart from the recording medium.

In the perpendicular magnetic recording head according to the invention, the inclined surface, which is inclined toward the trailing-side cross section at the tilt angle $\theta 1$ with respect to the virtual vertical line extending from the top surface of the recording medium, is formed on the trailing-side cross section of the main magnetic pole in such a manner that it extends in a height direction from the front-end surface. If the inclined surface is formed in the main magnetic pole, an absolute value of a magnetic field gradient $\alpha 1$ can be increased and a magnetization inversion width can be decreased. It is thus possible to reduce magnetization inversion noise.

Preferably, the tilt angle $\theta 1$ is within a range of from 1 to 6°.

Further, preferably, the tilt angle $\theta 1$ is within a range of from 2 to 5°.

Furthermore, preferably, the tilt angle $\theta 1$ is within a range of from 3 to 4°.

As described above, if the tilt angle is formed, a magnetization inversion width can be properly made small and magnetization inversion noise can be effectively reduced.

Preferably, an auxiliary magnetic pole is formed at the trailing side of the main magnetic pole with a non-magnetic material layer therebetween.

According to a second aspect of the invention, a method of manufacturing a perpendicular magnetic recording head includes: forming an insulation layer such that a film thickness gradually decreases from a front-end surface formed on the same surface as an opposite surface to a recording medium to a rear-end surface formed in a direction where the rear-end surface is spaced apart from the recording medium, wherein a top surface of the insulation layer is formed as an inclined surface; forming on the insulation layer a main magnetic pole which has a front-end surface opposite to the recording medium on the opposite surface using a magnetic material, wherein an inclined surface, which is inclined toward a trailing side at a tilt angle θ1 with respect to a virtual vertical line extending from a top surface of the recording medium, is formed in a trailing-side cross section of the main magnetic pole such that the inclined surface extends from the front-end surface in a height direction; and forming coil layers for applying a recording magnetic field to the main magnetic pole.

Preferably, during the forming of the main magnetic pole, the tilt angle θ1 is within a range of from 1 to 6°.

Preferably, during the forming of the main magnetic pole, the tilt angle θ1 is within a range of from 2 to 5°.

Preferably, during the forming of the main magnetic pole, the tilt angle θ1 is within a range of from 3 to 5°.

Preferably, during the forming of the main magnetic pole, the main magnetic pole is formed by a sputtering method.

Preferably, during the forming of the main magnetic pole, after the main magnetic pole is formed by plating, a top surface of the main magnetic pole is etched in an inclined direction and the inclined surface is then formed.

Preferably, before the forming of the coil layers, a non-magnetic material layer is formed at the trailing side of the main magnetic pole, and after the forming of the coil layers, an auxiliary magnetic pole is formed at the trailing side of the non-magnetic material layer.

DESCRIPTION OF THE PREFERRED EMBODIMENTS

Preferred embodiments of the present invention will now be described with reference to the drawings.

Figure 1:
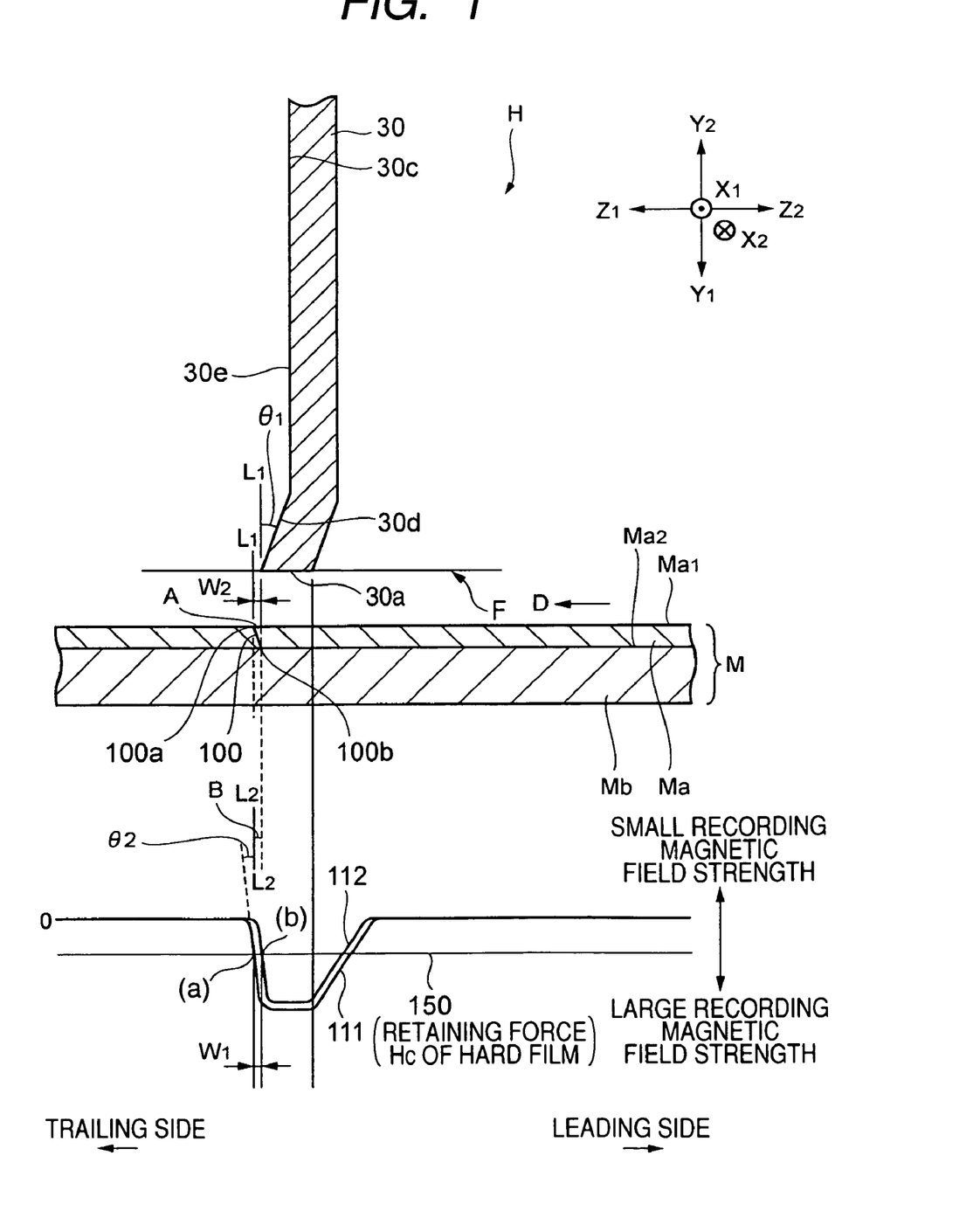
FIG. 1 is a partial longitudinal sectional view of a perpendicular magnetic recording head according to the invention, and a partial sectional view of a recording medium and a magnetic field strength curve.

FIG. 1 is a partial longitudinal sectional view of a perpendicular magnetic recording head H according to the invention.

The perpendicular magnetic recording head H shown in FIG. 1 serves to apply a perpendicular magnetic field to a recording medium M and magnetize a hard film Ma of the recording medium M in a vertical direction. Accordingly, the hard film Ma serves as a recording layer of the recording medium M.

The recording medium M has a disk shape. The hard film Ma with high remaining magnetization is formed on an outer surface of the recording medium M, and a soft film Mb with high magnetic permeability is formed at an inner side of the recording medium M. The recording medium M rotates with the center of the disk being the center of a rotation axis.

As shown in FIG. 1, a main magnetic pole 30 is formed to have a predetermined length from a surface F opposite to the recording medium in a direction where it becomes spaced apart from the recording medium (a direction of Y2 in FIG. 1). Furthermore, a front-end surface 30a is formed on the surface F of the main magnetic pole 30 opposite to the recording medium M. A width size of the front-end surface 30a in a track width direction (a direction of X1-X2 in FIG. 1), that is, a track width is Tw.

As shown in FIG. 1, since the recording medium M moves in an arrow direction D, the Z2-direction side of the main magnetic pole 30 shown in FIG. 1 travels on the recording medium prior to the Z1-direction side shown in FIG. 1, and thus becomes a 'leading side'. In contrast, the Z1-direction side shown in FIG. 1 travels on the recording medium after the Z2-direction side shown in FIG. 1, and thus becomes a 'trailing side'.

As shown in FIG. 1, a flat surface 30e, which extends in a direction vertical to a top surface Ma1 of the hard film Ma (that is, a top surface of the recording medium) constituting the recording medium M, and an inclined surface 30d inclined toward the trailing side at a tilt angle θ1 with respect to a virtual vertical line L1-L1, which extends in a direction vertical to the top surface Ma1 of the hard film Ma, are formed on a top surface (a trailing-side cross section) 30c of the main magnetic pole 30. The inclined surface 30d is formed to extend from the front-end surface 30a at a predetermined distance in a direction where it becomes spaced apart from the recording medium.

It is preferable that the tilt angle θ1 be formed within a range of 1 to 6°. If the tilt angle θ1 is within the range of 1 to 6°, a tilt angle θ2 of a recording magnetic field curve can be made small, which will be described in more details below. Therefore, since an absolute value of a magnetic field gradient α1 can be increased, a magnetization inversion width can become small. As a result, it is possible to make magnetization inversion noise small.

Furthermore, the tilt angle θ1 is preferably within a range of 2 to 5°, more preferably within a range of 3 to 4°. If the tilt angle θ1 is within a range of 2 to 5°, the magnetization inversion width can be suitably decreased. In addition, if the tilt angle θ1 is within a range of 3 to 4°, the magnetization inversion width can be further decreased.

The width of the front-end surface 30a of the main magnetic pole 30, that is, the track width Tw is 0.05 to 1.0 μm, preferably 0.05 to 0.2 μm.

Furthermore, a non-magnetic material layer 51 (a gap layer) made of an inorganic material such as $Al_2O_3$, $SiO_2$, or the like is formed in a state in which it comes into contact with the trailing-side cross section 30c of the main magnetic pole 30.

In the perpendicular magnetic recording head H shown in FIG. 1, if a recording current is applied to coil layers 36 to be described in details below, a recording magnetic field is induced in the main magnetic pole 30 by means of a current magnetic field of the current flowing through the coil layers 36. As shown in FIG. 1, in the opposite surface F, the leakage recording magnetic field from the front-end surface 30a of the main magnetic pole 30 passes through the hard film Ma of the recording medium M and then passes through the soft film Mb. At this time, a magnetic flux φ of the leakage recording magnetic field is concentrated on the front-end surface 30a of the main magnetic pole 30. The magnetic flux φ that has been concentrated causes the hard film Ma to be magnetized in a vertical direction, so that magnetic data is recorded into the hard film Ma.

In the perpendicular magnetic recording head H, the recording magnetic field induced into the main magnetic pole 30 spreads from the front-end surface 30a in an isotropic manner. At this time, magnetization inversion is generated using as a boundary an isomagnetic interface 100, which is an interface where the recording magnetic field strength from the main magnetic pole 30 is equal.

Recording magnetic field strength curves 111 and 112 of FIG. 1 show the relationship between the location using the main magnetic pole 30 as a reference, and the magnetic field strength (the recording magnetic field strength) of a recording magnetic field generated from the main magnetic pole 30 on the top and bottom surfaces Ma1 and Ma2 of the hard film Ma (that is, the recording layer) of the recording medium M. The recording magnetic field strength curve 111 shown in FIG. 1 indicates the recording magnetic field strength on the top surface Ma1, and the recording magnetic field strength curve 112 shown in FIG. 1 indicates the recording magnetic field strength on the bottom surface Ma2.

The recording magnetic field strength curves 111 and 112 of FIG. 1 show that as it approaches downward (the direction Y1 in FIG. 1), the recording magnetic field strength increases, whereas as it approaches upward (the direction Y2 in FIG. 1), the recording magnetic field strength decreases, as indicated by an arrow at the right side of the recording magnetic field strength curves 111 and 112.

As shown in FIG. 1, in a region that is spaced apart from the main magnetic pole 30 at a predetermined distance in the direction Z1, the recording magnetic field from the main magnetic pole 30 does not reach the region, and both the recording magnetic field strength on the top surface Ma1 of the hard film Ma and the recording magnetic field strength on the bottom surface Ma2 of the hard film Ma are all zero.

Furthermore, as it approaches the main magnetic pole 30 (the direction Z2 in FIG. 1), the recording magnetic field strength on the top surface Ma1 of the hard film Ma gradually increases, and the recording magnetic field strength rapidly increases over a region opposite to the trailing-side cross section 30c in the front-end surface 30a of the main magnetic pole 30, as indicated by a reference numeral 111.

In the same manner, as indicated by a reference numeral 112, as it approaches the main magnetic pole 30, the recording magnetic field strength on the bottom surface Ma2 of the hard film Ma gradually increases, and the recording magnetic field strength rapidly increases over a region opposite to the trailing-side cross section 30c on the front-end surface 30a of the main magnetic pole 30.

As described above, as it approaches the main magnetic pole 30, both the recording magnetic field strength on the top surface Ma1 of the hard film Ma and the recording magnetic field strength on the bottom surface Ma2 of the hard film Ma rapidly increase. As shown in FIG. 1, however, the recording magnetic field strength on the top surface Ma1 of the hard film Ma is larger than the recording magnetic field strength on the bottom surface Ma2 of the hard film Ma.

Furthermore, the recording magnetic field strength on the top surface Ma1 of the hard film Ma and the recording magnetic field strength on the bottom surface Ma2 of the hard film Ma have the maximum value in a region opposite to the front-end surface 30a of the main magnetic pole Moreover, as it becomes spaced apart from the main magnetic pole 30, the recording magnetic field strength gradually deceases. As a result, the recording magnetic field strength becomes zero at a location that is spaced apart from the main magnetic pole 30 at a predetermined distance.

A straight line 150 overlapping the recording magnetic field strength curves 111 and 112 shown in FIG. 1 indicates the amount of coercive force Hc of the hard film Ma constituting the recording medium M. As shown in FIG. 1, in the perpendicular magnetic recording head H, when the recording magnetic field strength on the top surface Ma1 and the bottom surface Ma2 of the hard film Ma is larger than the coercive force Hc of the hard film Ma (that is, the recording layer), magnetization inversion occurs in the hard film Ma. The hard film Ma is magnetized in a direction vertical to the top surface Ma1 (the direction Y1-Y2 in FIG. 1), so that magnetic data is recorded on the hard film Ma.

In this case, a width (a magnetization inversion width) in a recording medium sliding direction (the direction Z1-Z2 in FIG. 1) of a region where magnetization inversion occurs is related to a width (an isomagnetic interface width) in a recording medium sliding direction of the isomagnetic interface. Accordingly, if the magnetization inversion width is small, the isomagnetic interface width is small.

Furthermore, the isomagnetic interface width, and a magnetic field gradient α1 of the recording magnetic field (a recording magnetic field gradient) to be described in more detail below are also related to each other. Thus, if the isomagnetic interface width is small, the recording magnetic field gradient α1 is small.

In addition, the magnetic field gradient α1 of a recording magnetic field and the magnetization inversion width are also related to each other. Accordingly, if the recording magnetic field gradient α1 is small, the magnetization inversion width is small.

Moreover, magnetization inversion noise can be reduced by decreasing the magnetization inversion width.

Hereinafter, the relationship between the magnetization inversion width and the magnetic field gradient θ1 of the recording magnetic field, and the relationship between the magnetic field gradient α1 and the isomagnetic interface width will be described with reference to FIG. 1.

First, the magnetization inversion width is a distance W1 from the intersection a of the recording magnetic field strength curve 111 on the top surface Ma1 and the straight line 150 indicating the coercive force Hc of the hard film Ma to the intersection b of the recording magnetic field strength curve 112 on the bottom surface Ma2 and the straight line 150 indicating the coercive force Hc of the hard film Ma, in the direction Z1-Z2 in FIG. 1 (that is, the recording medium sliding direction), in the recording magnetic field strength curves 111 and 112 shown in FIG. 1. Magnetization inversion occurs in the region of the hard film Ma having this distance W1. The distance W1 is the magnetization inversion width W1. This region will be referred to as a region A.

In the perpendicular magnetic recording head H, the isomagnetic interface 100 exists within the hard film Ma at the location opposite to the region A in which magnetization inversion occurs. In addition, a distance (an isomagnetic interface width) W2 in the recording medium sliding direction (the direction Z1-Z2 in FIG. 1) between a top surface 100a and a bottom surface 100b of the isomagnetic interface 100 is equal to the magnetization inversion width W1.

As shown in FIG. 1, the recording magnetic field strength curve 111 of the top surface Ma1 within the magnetization inversion width W1 is inclined at a tilt angle θ2 with respect to a virtual vertical line L2-L2 that extends in a vertical direction to the top surface Ma1 of the hard film Ma.

In general, in the perpendicular magnetic recording head, magnetization inversion is generated using the isomagnetic interface 100 as a boundary. Furthermore, as described above, the isomagnetic interface width W2 of the isomagnetic interface 100 is equal to the magnetization inversion width W1.

Accordingly, generally, in the perpendicular magnetic recording head, in order to decrease the magnetization inversion width W1 (the isomagnetic interface width W2), it is necessary to make the tilt angle θ2 decreased. In other words, the magnetization inversion width W1 can be decreased by reducing the tilt angle θ2. It is thus possible to reduce magnetization inversion noise.

Furthermore, the tilt angle θ2 can be made small by increasing the absolute value of the magnetic field gradient α1 (the recording magnetic field gradient), which is defined as the magnetic field strength in a direction vertical to the top surface Ma1 (the direction Y1-Y2 direction in FIG. 1) and is varied per unit distance of the recording medium sliding direction (the direction Z1-Z2 in FIG. 1).

In the perpendicular magnetic recording head H of the invention, the main magnetic pole 30 has an inclined surface 30d inclined toward the trailing side. If the main magnetic pole 30 is constructed to have the inclined surface 30d as described above, the tilt angle θ2 can be made small. This will be described in more details below.

FIG. 2 shows the relationship between the location of the main magnetic pole 130 and the recording magnetic field strength generated from the main magnetic pole 130, in the main magnetic pole 130 of a comparative example in which the inclined surface 30d having the tilt angle θ1 is not formed in the main magnetic pole 30. FIG. 2 corresponds to FIG. 1. The recording magnetic field strength curves 211 and 212 of FIG. 2 also show the relationship between the location using the main magnetic pole 130 as a reference, and the magnetic field strength (the recording magnetic field strength) of the recording magnetic field generated from the main magnetic pole 130 on the top surface Ma1 and the bottom surface Ma2 of the hard film Ma (that is, the recording layer) of the recording medium M. A reference numeral 211 shown in FIG. 2 indicates the recording magnetic field strength on the top surface Ma1 and a reference numeral 212 indicates the recording magnetic field strength on the bottom surface Ma2.

The recording magnetic field strength curves 211 and 212 of FIG. 2 also show that as it approaches downward (the direction Y1 in FIG. 2), the recording magnetic field strength increases, whereas as it approaches upward (direction Y2 in FIG. 2), the recording magnetic field strength decreases, as indicated by the arrow at the right side of the recording magnetic field strength curves.

As shown in FIG. 2, even when the inclined surface 30d formed in the main magnetic pole 30 is not formed in the main magnetic pole 130, the recording magnetic field strength curves 211 and 212 show that the recording magnetic field from the main magnetic pole 130 does not reach a region that is spaced apart from the main magnetic pole 130 at a predetermined distance in the direction Z1, and the recording magnetic field strength on the top surface Ma1 of the hard film Ma and the recording magnetic field strength on the bottom surface Ma2 are all zero.

Furthermore, as it approaches the main magnetic pole 130 (toward the direction Z2 in FIG. 2), the recording magnetic field strength on the top surface Ma1 of the hard film Ma gradually increases. Further, in the region opposite to the trailing-side cross section 130c in the front-end surface 130a of the main magnetic pole 130, the recording magnetic field strength rapidly increases.

In the same manner, as it approaches the main magnetic pole 130, the recording magnetic field strength on the bottom surface Ma2 of the hard film Ma also gradually increases. In the region opposite to the trailing-side cross section 130c on the front-end surface 130a of the main magnetic pole 130, the recording magnetic field strength rapidly increases.

As described above, as it approaches the main magnetic pole 130, both the recording magnetic field strength on the top surface Ma1 of the hard film Ma and the recording magnetic field strength on the bottom surface Ma2 of the hard film Ma rapidly increase. As shown in FIG. 2, however, the recording magnetic field strength on the top surface Ma1 of the hard film Ma is larger than the recording magnetic field strength on the bottom surface Ma2 of the hard film Ma.

Furthermore, the recording magnetic field strength on the top surface Ma1 of the hard film Ma and the recording magnetic field strength on the bottom surface Ma2 of the hard film Ma have the maximum value in the region opposite to the front-end surface 130a of the main magnetic pole 130.

In addition, as it becomes spaced apart from the main magnetic pole 130 in the direction Z2, the recording magnetic field strength gradually decreases and then becomes zero.

The straight line 250 overlapping the recording magnetic field strength curves shown in FIG. 2 indicates the amount of the coercive force Hc of the hard film Ma constituting the recording medium M. As shown in FIG. 2, in the perpendicular magnetic recording head H, when the recording magnetic field strength is larger than the coercive force Hc of the hard film Ma (that is, a recording layer), magnetization inversion is generated in the hard film Ma. This causes the hard film Ma to be magnetized in a vertical direction, so that magnetic data is recorded on the hard film Ma.

The magnetization inversion width is the distance W3 from the intersection c of the recording magnetic field strength curve 211 on the top surface Ma1 and the straight line 250 indicating the coercive force Hc of the hard film Ma to the intersection d of the recording magnetic field strength curve 212 on the bottom surface Ma2 and the straight line 250 indicating the coercive force Hc of the hard film Ma, in the direction Z1-Z2 (that is, the recording medium sliding direction), in the recording magnetic field strength curves shown in FIG. 2. Magnetization inversion is generated in the region of the hard film Ma having this distance W3. The distance W3 is the magnetization inversion width W3. The region of the hard film Ma having this distance W3 (that is, the region in which magnetization inversion is generated) will be referred to as a region B.

An isomagnetic interface 200 exists within the hard film Ma of a location opposite to the region B in which magnetization inversion is generated. Accordingly, a distance (an isomagnetic interface width) W4 in a recording medium sliding direction (the direction Z1-Z2 in FIG. 2) between a top surface 200a and a bottom surface 200b of the isomagnetic interface 200 is equal to the magnetization inversion width W3.

In FIG. 2, the recording magnetic field strength curve 211 of the top surface Ma1 within the magnetization inversion width W3 is inclined at a tilt angle θ3 from a virtual vertical line L3-L3 that extends in a vertical direction to the top surface Ma1 of the hard film Ma.

If the main magnetic pole 130 has the shape shown in FIG. 2, that is, the shape in which the inclined surface 30d with the tilt angle θ1 is not formed, as in the main magnetic pole 30 shown in FIG. 1, the tilt angle θ3 of the recording magnetic field strength curve 211 in the top surface Ma1 of the hard film Ma is increased compared with the main magnetic pole 30 in which the inclined surface 30d with the tilt angle θ1 is formed, as shown in FIG. 1. That is, the tilt angle θ2 shown in FIG. 1 and the tilt angle θ3 shown in FIG. 2 has the relationship of θ2 <θ3.

The reason will be described as follows. If the inclined surface 30d with the tilt angle θ1 is formed as in the main magnetic pole 30 shown in FIG. 1, a recording magnetic field generated from the front-end surface 30a of the main magnetic pole 30 widely spreads in a direction inclined at the tilt angle θ1. Thus, the recording magnetic field at the trailing side is inclined toward the leading side, so that the recording magnetic field strength curves 111 and 112 shown in FIG. 1 are formed. If the inclined surface 30d is not formed as in the main magnetic pole 130 shown in FIG. 2, however, a recording magnetic field generated from the front-end surface 130a of the main magnetic pole 130 spreads in a vertical direction to the top surface Ma1 of the hard film Ma. Thus, the recording magnetic field at the trailing side is greatly inclined toward the trailing side, so that the distribution of the recording magnetic field strength curves 211 and 212 shown in FIG. 2 is obtained.

As described above, since the inclined surface 30d is formed in the main magnetic pole 30 shown in FIG. 1, the tilt angle θ2 can be made small. In this case, the tilt angle θ2 is related to the magnetization inversion width W1. Due to this, if the tilt angle θ2 is increased, the magnetization inversion width W1 is increased. Furthermore, if data is recorded on the recording medium M using the main magnetic pole 30 of a shape in which the inclined surface 30d is formed, the tilt angle θ2 can be made smaller than the tilt angle θ3 of the main magnetic pole 130 in which the inclined surface 30d is not formed. Accordingly, the magnetization inversion width W1 of the main magnetic pole 30 in which the inclined surface 30d is formed can be made smaller than the magnetization inversion width W3 of the main magnetic pole 130 in which the inclined surface 30d is not formed.

At this time, the isomagnetic interface width W2 of the isomagnetic interface 100 has the same size as the magnetization inversion width W1. Thus, the isomagnetic interface width W2 can be made smaller than the isomagnetic interface width W4 of the isomagnetic interface 200 shown in FIG. 2.

As described above, in the main magnetic pole 30 in which the inclined surface 30d with the tilt angle θ1 is formed, the magnetization inversion width W1 can be made smaller than that of the case where the inclined surface 30d is not formed. It is thus possible to reduce magnetization inversion noise.

In this case, the magnetic field gradient α1 of the recording magnetic field refers to the magnetic field strength in a direction vertical to the top surface Ma1, which varies per unit area of the recording medium sliding direction. Further, the tilt angle θ3 can be defined as a tilt angle from the virtual vertical line L3-L3, which extends in a direction vertical to the top surface Ma1 with respect to the recording magnetic field strength curve 211 of the top surface Ma1 within the magnetization inversion width W3, which is defined as the distance in the recording medium sliding direction, as described above. For this reason, the recording magnetic field gradient α1 related to the recording medium sliding direction and the magnetic field strength, and the tilt angle θ3 have a correlation with each other. Accordingly, if the tilt angle θ3 decreases, an absolute value of the recording magnetic field gradient α1 increases.

Figure 11:
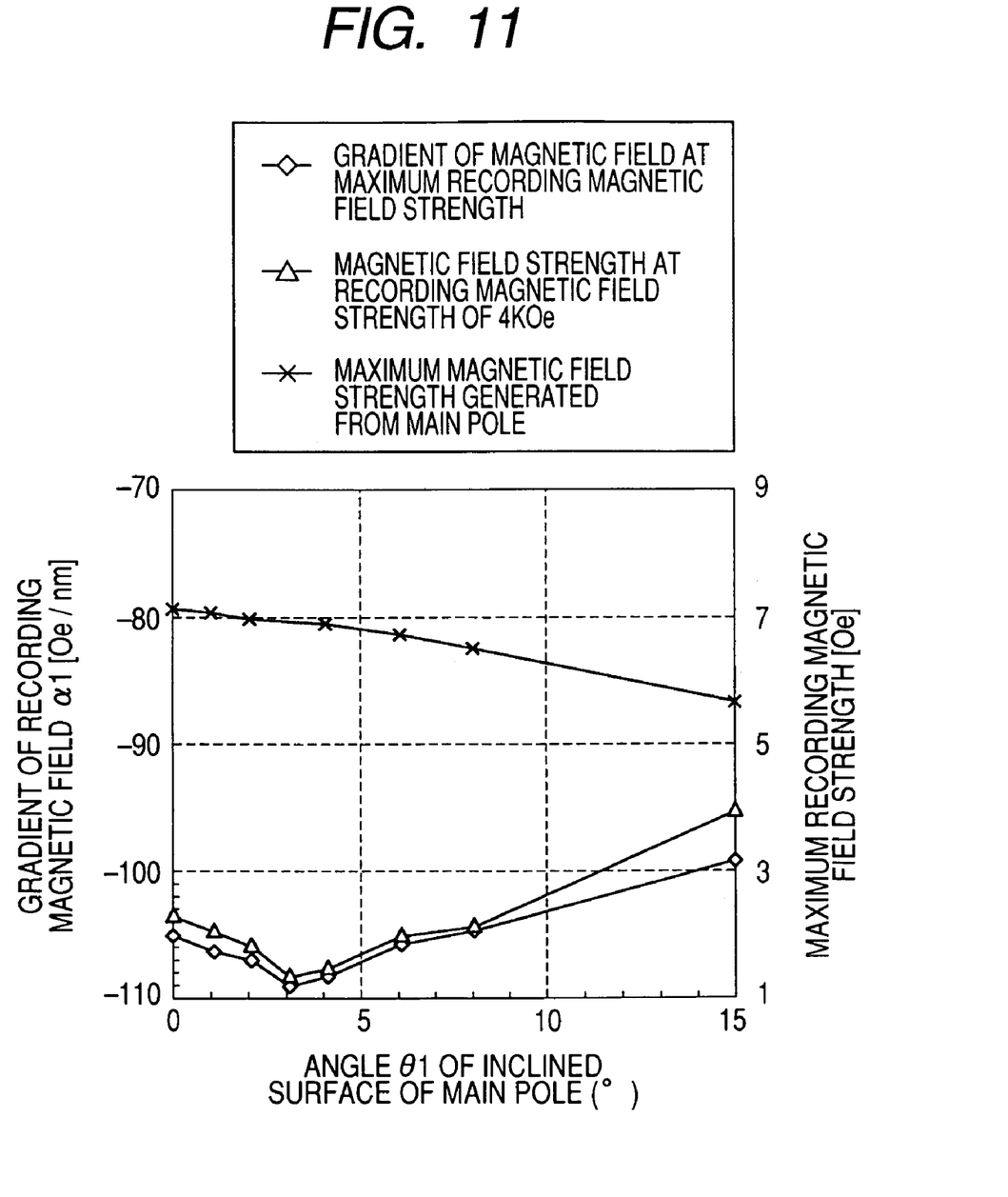
FIG. 11 is a graph illustrating the relationship between a tilt angle θ1 of an inclined surface formed in a main magnetic pole and a magnetic field gradient, and the relationship between the tilt angle θ1 and the highest recording magnetic field strength generated from a main magnetic pole.

FIG. 11 is a graph illustrating the relationship between the tilt angle θ1 of the inclined surface 30d formed in the main magnetic pole 30 and the recording magnetic field gradient α1 (that is, an inverse tangent value of the tilt angle θ2, and the relationship between the tilt angle θ1 of the inclined surface 30d formed in the main magnetic pole 30 and the maximum recording magnetic field strength generated from the main magnetic pole 30. The graph of FIG. 11 shows measurement results when the recording magnetic field strength is 4 K [Oe] and the maximum strength (a longitudinal axis at the right side of the graph).

Furthermore, the graph of FIG. 11 shows the recording magnetic field gradient α1 as the magnetic field gradient (the recording magnetic field gradient) α1 [Oe/nm], that is, a magnetic field strength of a direction vertical to the top surface Ma1 (the direction Y1-Y2 in FIG. 1) with respect to a unit distance (nm) in the recording medium sliding direction (the direction Z1-Z2 in FIG. 1). The greater the absolute value of α1 [Oe/nm], the smaller the tilt angle θ2.

As shown in FIG. 11, if the tilt angle θ1 of the inclined surface 30d is 1 to 6°, the absolute value of the magnetic field gradient α1 can be 103 [Oe/nm] or more both when the recording magnetic field strength is 4 K [Oe] and when the recording magnetic field strength is the maximum strength. Furthermore, if the tilt angle θ1 of the inclined surface 30d is 2 to 5°, the absolute value of the magnetic field gradient α1 can be 106 [Oe/nm] or more both when the recording magnetic field strength is 4 K [Oe] and when the recording magnetic field strength is the maximum strength. In addition, when the tilt angle θ1 of the inclined surface 30d is 3 to 4°, the absolute value of the magnetic field gradient α1 can be 108 [Oe/nm] or more both when the recording magnetic field strength is 4 K [Oe] and when the recording magnetic field strength is the maximum strength.

It can also be seen that although the tilt angle θ1 of the inclined surface 30d is within the above range, the magnetic field gradient α1 generated from the main magnetic pole 30 is not significantly lowered.

The perpendicular magnetic recording head H according to the invention has the main magnetic pole 30, and the inclined surface 30d, which is inclined at a predetermined tilt angle θ1 and is formed in the trailing-side cross section 30c of the main magnetic pole 30. An embodiment of the perpendicular magnetic recording head H according to the invention will be described with reference to FIG. 3.

Figure 3:
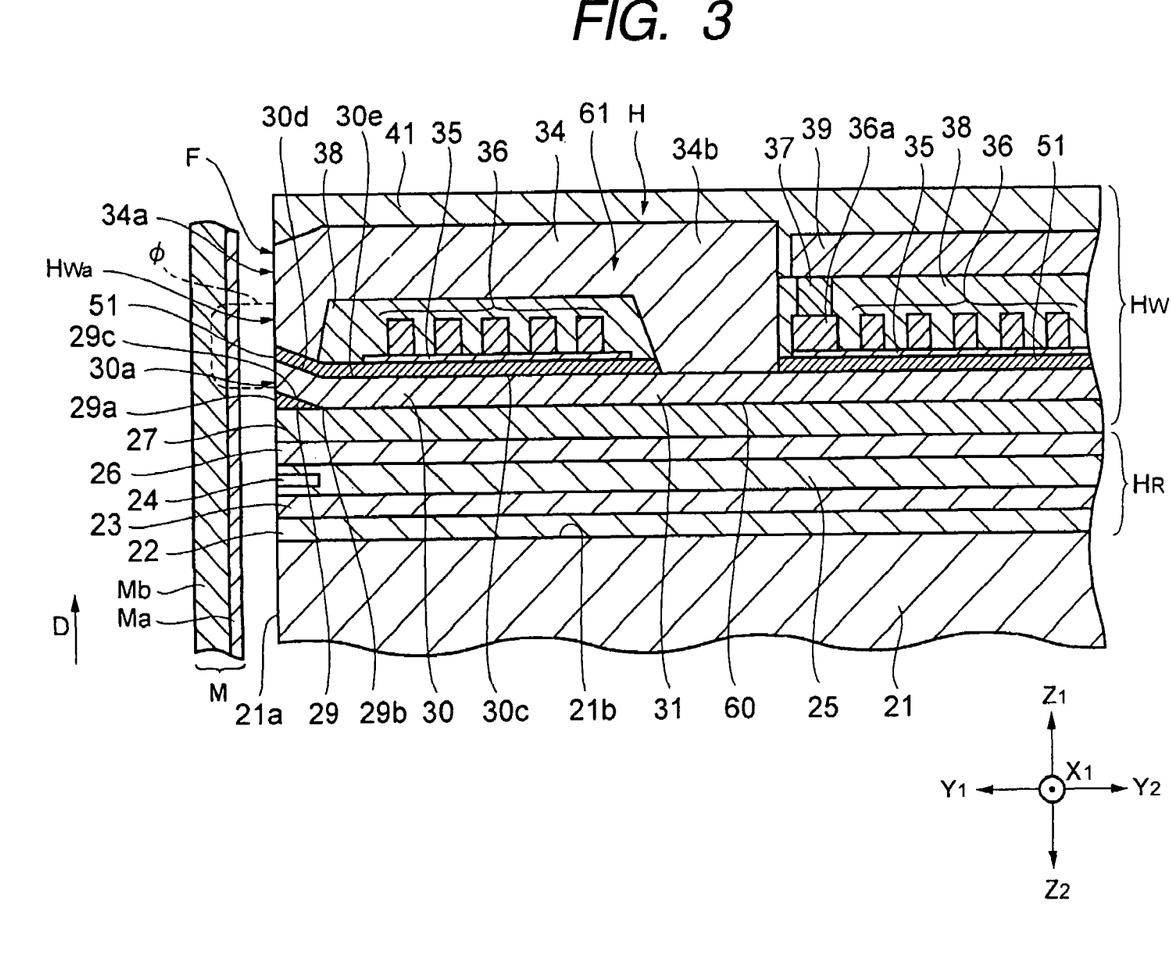
FIG. 3 is a partial longitudinal sectional view of a magnetic head including an inductive head, which is an embodiment of the perpendicular magnetic recording head shown in FIG. 1.

FIG. 3 is a partial longitudinal sectional view of a magnetic head including an inductive head, which is an embodiment of the perpendicular magnetic recording head H according to the invention.

In FIG. 3, a reference numeral 21 indicates a slider and is made of a non-magnetic material such as $Al_2O_3 \cdot Tic$ or the like. An opposite surface 21a of the slider 21 is opposite to a recording medium M. If the recording medium M rotates, the slider 21 is floated from a surface of the recording medium M by the air flow on the surface, or the slider 21 slides on the recording medium M. In FIG. 3, a moving direction of the recording medium M with respect to the slider 21 is a direction D.

A non-magnetic insulation layer 22 made of an inorganic material such as $Al_2O_3$ or $SiO_2$ is formed on a trailing-side cross section 21b of the slider 21. A reading part $H_R$ is formed on the non-magnetic insulation layer 22.

The reading part $H_R$ includes a lower shield layer 23, an upper shield layer 26, and a reading element 24 located within an inorganic insulation layer (a gap insulation layer) 25 between the lower shield layer 23 and the upper shield layer 26. The reading element 24 is an element using a magnetic resistance effect, such as AMR, GMR, TMR or the like.

A separation layer 27 made of an inorganic material such as Al$_2$O$_3$ or SiO$_2$ is formed on the reading part H$_R$. An inductive head Hw for recording, which is an embodiment of the perpendicular magnetic recording head H according to the invention, is provided on the separation layer 27. An opposite surface Hwa of the inductive head Hw to the recording medium M has almost the same surface as the opposite surface 21a of the slider 21.

Further, only the inductive head Hw for recording can be provided at the end of the trailing side of the slider 21 without providing the reading part H$_R$.

An insulation layer 29, which extends in a direction in which it becomes spaced apart from the opposite surface F to the recording medium with respect to the recording medium at a predetermined distance, is formed on a top surface of the separation layer 27. The insulation layer 29 has a film thickness, which gradually decreases from a front-end surface 29a formed on the same surface as the opposite surface F to the recording medium to a rear-end surface 29b formed in a direction in which it is becomes spaced apart from the recording medium. Accordingly, a top surface 29c of the insulation layer 29 becomes an inclined surface.

A main magnetic pole 30 with a tilt angle θ1 is formed on a plating base layer (not shown) and the insulation layer 29. In the main magnetic pole 30, a part appearing on the opposite surface F has a track width Tw, which is a width in a track width direction.

As shown in FIG. 3, an inclined surface 30d of the main magnetic pole 30 is formed on the insulation layer 29. A flat surface 30e of the main magnetic pole 30 is formed on the separation layer 27.

A yoke portion 31 is integrated with the main magnetic pole 30 from the base end of the main magnetic pole 30. The yoke portion 31 extends such that a width in a track width direction in a direction in which it becomes spaced apart from the recording medium becomes larger than the track width Tw. The main magnetic pole 30 and the yoke portion 31 constitute a first magnetic portion 60. The first magnetic portion 60 is plated with a ferromagnetic material, and can be formed of a material with a high saturation magnetic flux density, such as Ni—Fe, Co—Fe, Ni—Fe—Co or the like.

A plating base layer made of a conductive metal film such as NiFe is also formed on the separation layer 27 and the insulation layer 29. The main magnetic pole 30 and the yoke portion 31 may be formed on the plating base layer.

A non-magnetic material layer 51 (a gap layer) made of an inorganic material such as Al$_2$O$_3$ or SiO$_2$ is formed on the trailing-side cross section 30c of the main magnetic pole 30.

An auxiliary magnetic pole 34, which is made of a ferromagnetic material such as permalloy and serves as a second magnetic portion 61, is formed on the non-magnetic material layer 51. The front-end surface 34a of the auxiliary magnetic pole 34 is exposed to the opposite surface F to the recording medium M. Furthermore, a connector 34b of the auxiliary magnetic pole 34 and the first magnetic portion 60 are magnetically connected at the inner side than the opposite surface F. Thereby, a magnetic path connecting the auxiliary magnetic pole 34, the yoke portion 31 and the main magnetic pole 30 is formed.

A coil insulation base layer 35 is formed around the connector 34b. Coil layers 36 made of conductive materials such as Cu are formed on the coil insulation base layer 35. The coil layers 36 are formed by means of a frame plating method, etc., and are patterned in a spiral shape such that they have a predetermined winding number around the connector 34b. A bottom raising layer 37 made of a conductive material such as Cu is formed on a connection end 36a at the center of the winding of the coil layers 36.

However, the coil layers 36 can have a toroidal shape in a film thickness direction such that they are wound around the main magnetic pole 30 or the yoke portion 31 by a predetermined winding number.

The coil layers 36 and the bottom raising layer 37 are covered with a coil insulation layer 38 made of an organic material such as a resist material. Although not shown in the drawing, the coil insulation layer 38 can be covered with an inorganic insulation layer such as Al$_2$O$_3$. The auxiliary magnetic pole 34 is formed on the coil insulation layer 38.

Further, a top surface of the bottom raising layer 37 is also exposed to the surface of the coil insulation layer 38 and is connected to a lead layer 39. Thus, a recording current can be supplied from the lead layer 39 to the bottom raising layer 37 and the coil layers 36.

In addition, the auxiliary magnetic pole 34 and the lead layer 39 are covered with a protection layer 41 made of an inorganic non-magnetic insulation material.

As shown in FIG. 3, the front-end surface 34a of the auxiliary magnetic pole 34 and the front-end surface 30a of the main magnetic pole 30 appear on the opposite surface F.

In the inductive head Hw shown in FIG. 3, if a recording current is applied to the coil layers 36 through the lead layer 39, by means of a current magnetic field of the current flowing through the coil layers 36, a recording magnetic field is induced into the auxiliary magnetic pole 34, the yoke portion 31 and the main magnetic pole 30. As shown in FIG. 3, in the opposite surface F, the leakage recording magnetic field from the front-end surface 30a of the main magnetic pole 30 and the front-end surface 34a of the auxiliary magnetic pole 34 passes through the soft film Mb through the hard film Ma of the recording medium M. At this time, the magnetic flux φ of the leakage recording magnetic field is concentrated on the front-end surface 30a of the main magnetic pole 30. The concentrated magnetic flux φ magnetizes the hard film Ma in a vertical direction, so that magnetic data is recorded on the hard film Ma.

In this case, since the inclined surface 30d is formed in the main magnetic pole 30, a tilt angle θ2 formed in the hard film Ma constituting the recording medium can be made small. Accordingly, the magnetization inversion width W1 can be made small and magnetization inversion noise can be reduced.

A method of manufacturing a magnetic head having an inductive head, which is an embodiment of the perpendicular magnetic recording head H of the invention, will now be described.

Further, in processes to be described below, a method of forming constituent elements formed downwardly from the separation layer 27 (the direction Z2 in FIG. 3) will be omitted. Only a method of forming respective constituent elements from the separation layer 27 to the auxiliary magnetic pole will be described.

Figure 4:
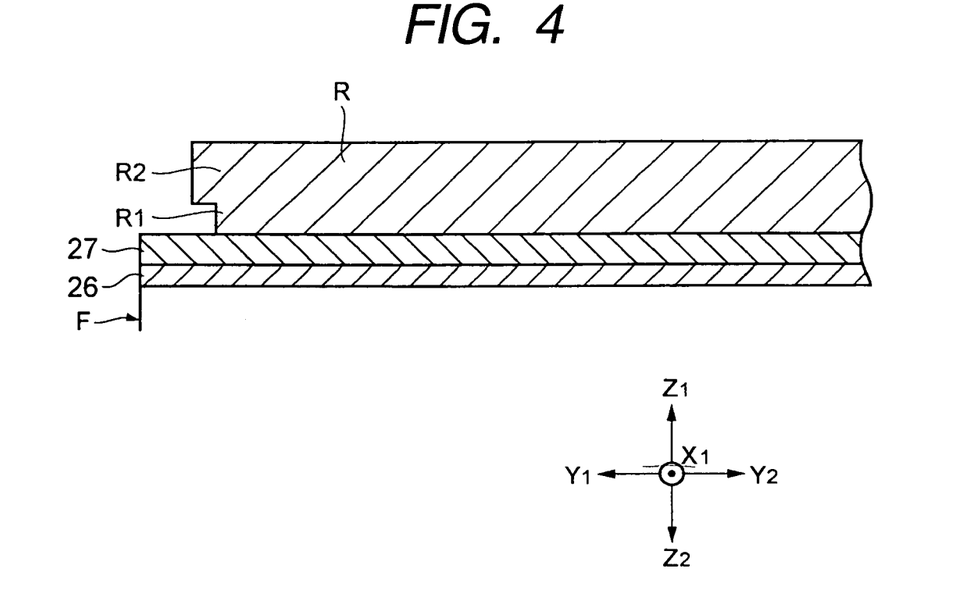
FIG. 4 is a process diagram illustrating a method of manufacturing the magnetic head shown in FIG. 3.

Referring to FIG. 4, the separation layer 27 made of an inorganic material such as Al$_2$O$_3$ or SiO$_2$ is formed on the upper shield layer 26. A resist layer R for liftoff is formed on the separation layer 27 by pattern exposure. The resist layer R includes a lower portion R1 that is partially cut, and an upper portion R2 formed on the lower portion R1. A front-end surface of the upper portion R2 is located so as to be closer to the opposite surface F than a front-end surface of the lower portion R1. The front-end surface of the upper portion R2 is located in a direction in which it becomes spaced apart from the recording medium by a predetermined distance from the opposite surface.

Figure 5:
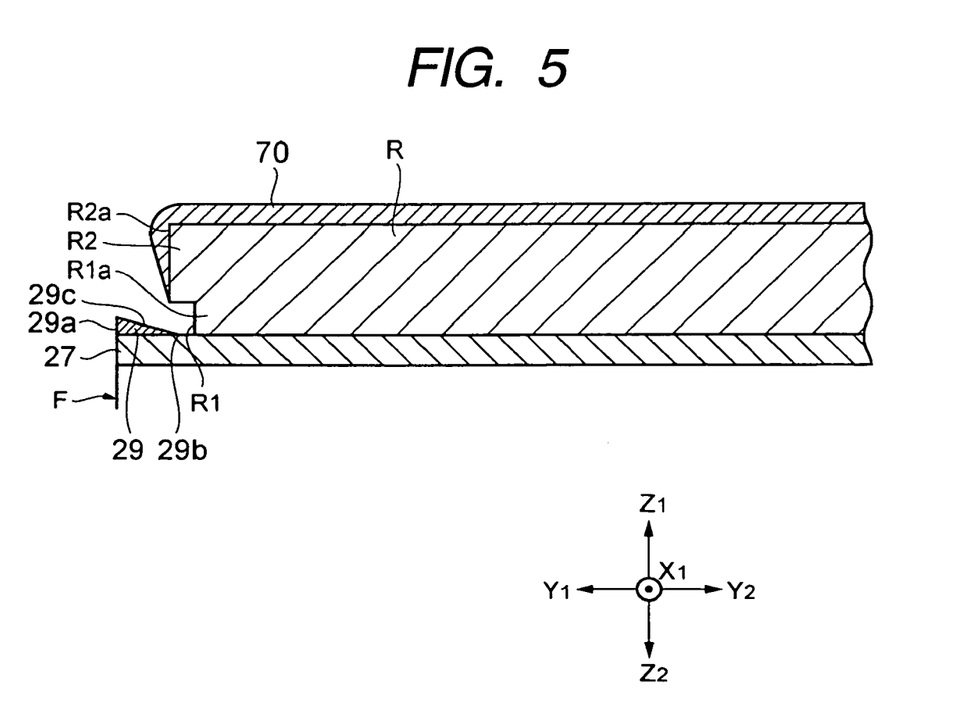
FIG. 5 is a process diagram illustrating one process that is performed after the process shown in FIG. 4.

Referring to FIG. 5, an insulation layer 29 is formed on the separation layer 27 by a liftoff method such that it extends from the opposite surface F to the recording medium in a height direction by a predetermined distance. The insulation layer 29 is formed such that a film thickness gradually decreases small from a front-end surface 29a formed on the same surface as the opposite surface F to the recording medium to a rear-end surface 29b, which is formed in a direction in which it is spaced apart from the recording medium. A top surface 29c of the insulation layer 29 is formed as an inclined surface. At this time, a material layer 70, which is the same as the insulation layer 29, is also formed in the resist layer R.

Figure 6:
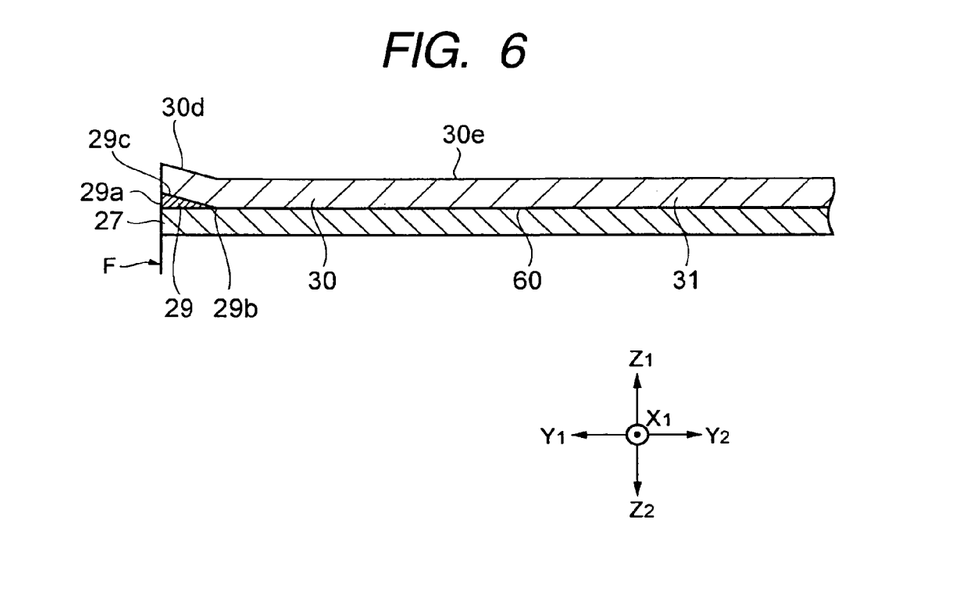
FIG. 6 is a process diagram illustrating one process that is performed after the process shown in FIG. 5.

Referring to FIG. 6, after the resist layer R is removed, the first magnetic portion 60 having the main magnetic pole 30 and the yoke portion 31 is formed on the separation layer 27 and the insulation layer 29. The main magnetic pole 30 and the yoke portion 31 can be formed by a known method, for example, a sputtering method. The first magnetic portion 60 can be formed using a material with a high saturation magnetic flux density, such as Ni—Fe, Co—Fe, Ni—Fe—Co or the like.

At this time, the main magnetic pole 30 is formed on the insulation layer 29 and the separation layer 27. A portion of the main magnetic pole 30, which is formed at a portion in which the insulation layer 29 is not formed, on the separation layer 27, becomes the flat surface 30e. A portion of the main magnetic pole 30, which is formed at a portion in which the insulation layer 29 is formed, on the separation layer, becomes the inclined surface 30d.

Figure 7:
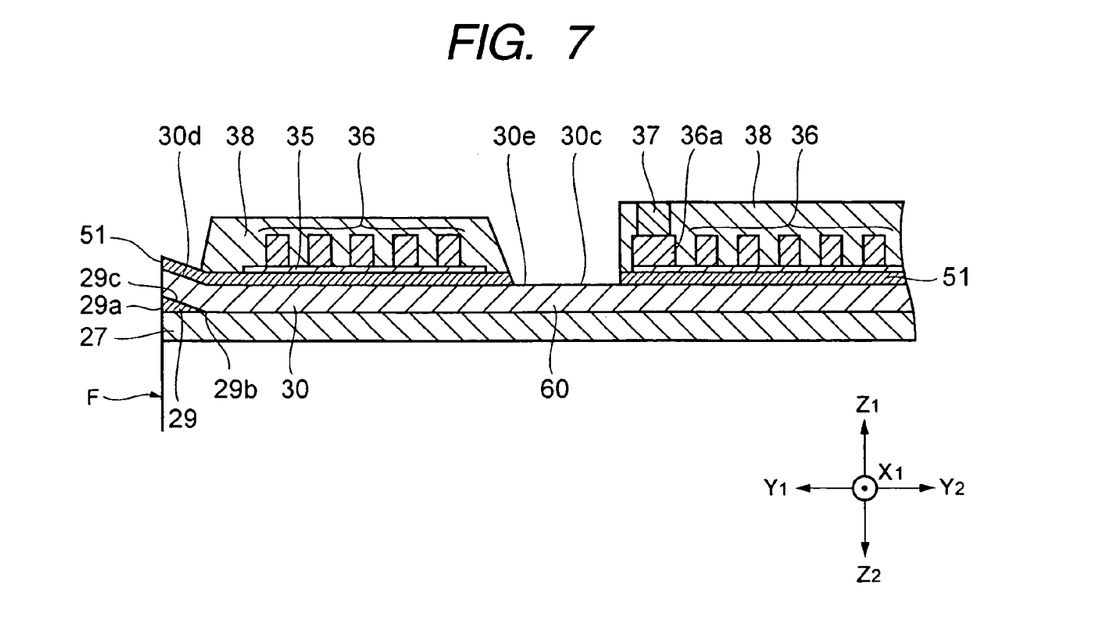
FIG. 7 is a process diagram illustrating one process that is performed after the process shown in FIG. 6.
Figure 8:
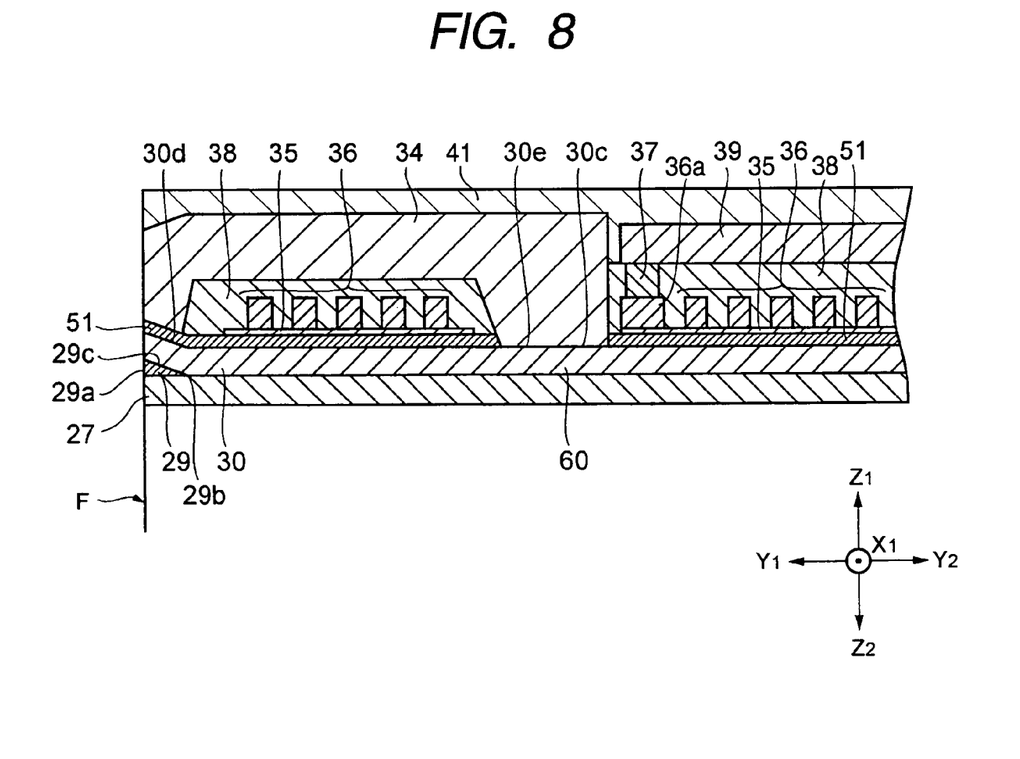
FIG. 8 is a process diagram illustrating one process that is performed after the process shown in FIG. 7.

Referring to FIG. 7, a non-magnetic material layer (gap layer) 51 made of an inorganic material such as $Al_2O_3$ or $SiO_2$ is formed on the trailing-side cross section 30c of the main magnetic pole 30. The coil insulation base layer 35, the coil layers 36, the connection end 36a, the bottom raising layer 37 and the coil insulation layer 38 are formed by a known method. As shown in FIG. 8, the auxiliary magnetic pole 34 serving as the second magnetic portion 61, and the protection layer 41 are formed by a known method, thus completing the magnetic head as shown in FIG. 3.

Further, the coil layers 36 can be manufactured by winding them in a thickness direction in a toroidal shape such that they have a predetermined winding number on the main magnetic pole 30 or the yoke portion 31.

Figure 9:
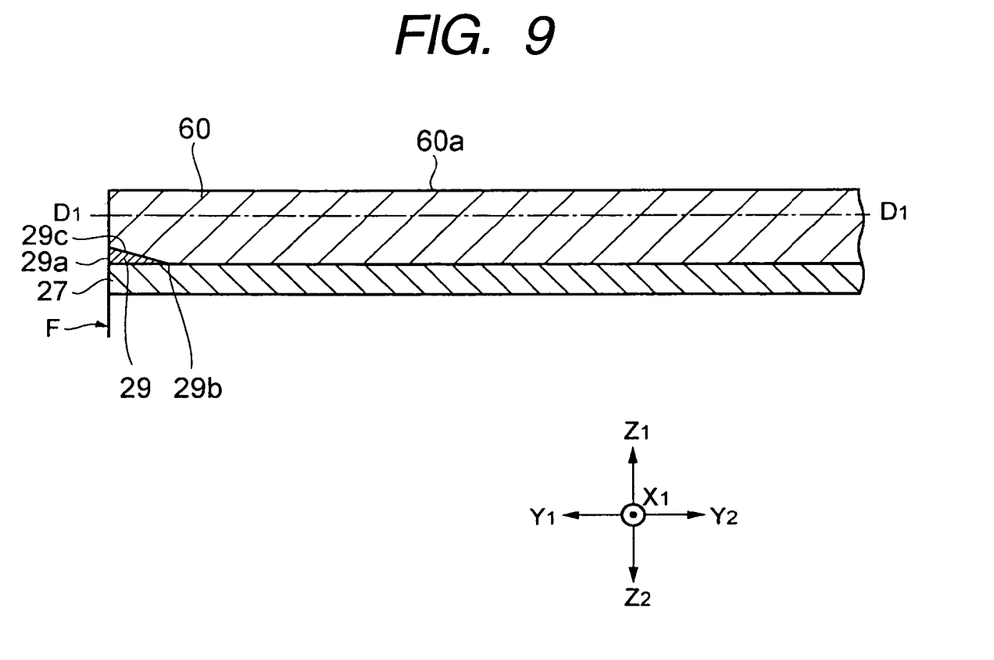
FIG. 9 is a process diagram illustrating another method of manufacturing the magnetic head shown in FIG. 3.

Furthermore, the main magnetic pole 30 and the yoke portion 31 can be formed by methods other than the sputtering method. In other words, after the process shown in FIG. 5, a plating base film (not shown) made of a magnetic material such as NiFe can be formed on the separation layer 27 and the insulation layer 29 by a known method such as a sputtering method, as shown in FIG. 9. A resist layer is formed on the plating base layer (not shown) through pattern exposure. The first magnetic portion 60 having the main magnetic pole 30 and the yoke portion 31 is formed through plating using the base film as an electrode.

Thereafter, a top surface 60a of the first magnetic portion 60 is cut away up to a line D1-D1 by a known method such as chemical mechanical polishing (CMP). A state where the first magnetic portion 60 is cut away up to the line D1-D1 is shown in FIG. 10.

Figure 10:
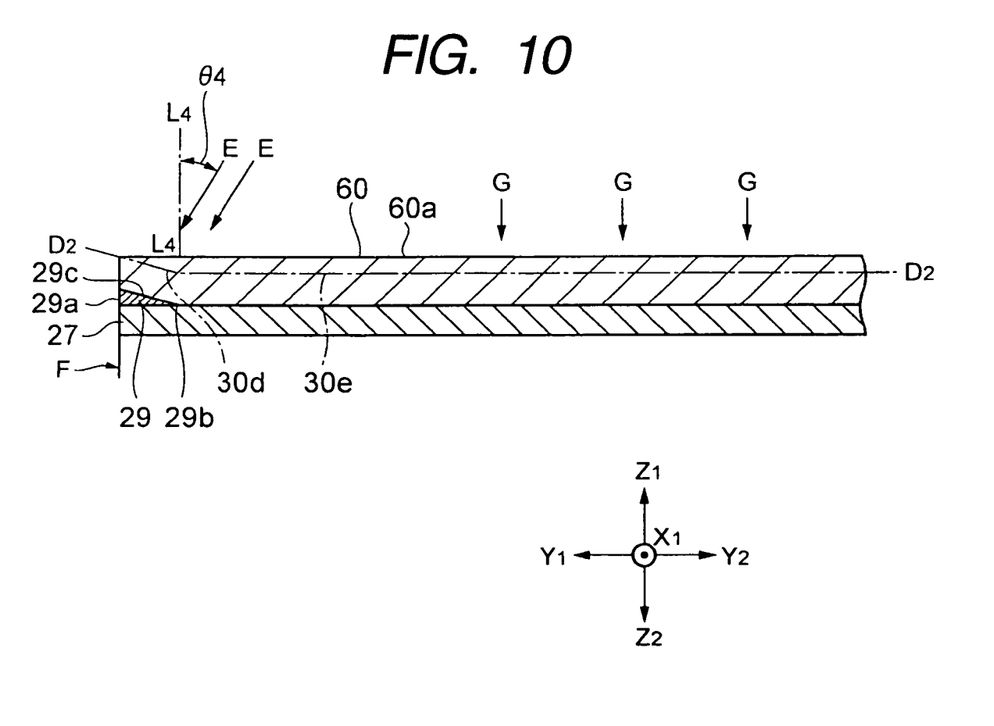
FIG. 10 is a process diagram illustrating one process that is performed after the process shown in FIG. 9.

Referring to FIG. 10, an ion milling process is performed from an arrow direction E and is then performed from an arrow direction G. As shown in a line D2-D2, the top surface 60a of the first magnetic portion 60 is cut away. At this time, when performing the ion milling process from the arrow direction E, the inclined surface 30d of the main magnetic pole 30 is mainly formed. When performing the ion milling process from the arrow direction G, the flat surface 30e of the main magnetic pole 30 is mainly formed.

Further, in the process shown in FIG. 10, the ion milling method has been described as an example of the method of cutting the top surface 60a of the first magnetic portion 60. In the invention, however, an etching method having an isotropic property can also be used.

An angle θ4 in the arrow direction E is within a range of 45 to 75° with respect to a virtual vertical line L4-L4 that extends from the top surface 60a in a state shown in FIG. 10 (that is, a state in which the top surface 60a of the first magnetic portion 60 is cut away up to a line D1-D1 shown in FIG. 9).

Thereafter, the magnetic head can be obtained by a method such as the processes shown in FIGS. 7 and 8.

The invention claimed is:

1. A perpendicular magnetic recording head including:
   a main magnetic pole which has a front-end surface opposite to a recording medium on an opposite surface to the recording medium and is made of a magnetic material, and
   coil layers for applying a recording magnetic field to the main magnetic pole,
   wherein an inclined surface, which is inclined toward a trailing side at a tilt angle θ1 with respect to a virtual vertical line extending from a top surface of the recording medium, is formed in a trailing-side cross section of the main magnetic pole, and the inclined surface extends from the front-end surface in a direction where the inclined surface is spaced apart from the recording medium and wherein an auxiliary magnetic pole is formed at the trailing side of the main magnetic pole with a non-magnetic material layer therebetween.

2. The perpendicular magnetic recording head according to claim 1, wherein the tilt angle θ1 is within a range of from 1 to 6°.

3. The perpendicular magnetic recording head according to claim 2, wherein the tilt angle θ1 is within a range of from 2 to 5°.

4. The perpendicular magnetic recording head according to claim 3, wherein the tilt angle θ1 is within a range of from 3 to 4°.

5. A method of manufacturing a perpendicular magnetic recording head, the method comprising:
   forming an insulation layer such that a film thickness gradually decreases from a front-end surface formed on the same surface as an opposite surface to a recording medium to a rear-end surface formed in a direction where the rear-end surface is spaced apart from the recording medium, wherein a top surface of the insulation layer is formed as an inclined surface;
   forming on the insulation layer a main magnetic pole which has a front-end surface opposite to the recording medium on the opposite surface using a magnetic material, wherein an inclined surface, which is inclined toward a trailing side at a tilt angle θ1 with respect to a virtual vertical line extending from a top surface of the recording medium, is formed in a trailing-side cross section of the main magnetic pole such that the inclined surface extends from the front-end surface in a direction where the inclined surface is spaced apart from the recording medium;

forming a non-magnetic material layer at the trailing side of the main magnetic pole;

forming coil layers for applying a recording magnetic field to the main magnetic pole; and forming an auxiliary magnetic pole at the trailing side of the non-magnetic material layer.

6. The method of manufacturing a perpendicular magnetic recording head according to claim 5, wherein during the forming of the main magnetic pole, the tilt angle θ1 is within a range of from 1 to 6°.

7. The method of manufacturing a perpendicular magnetic recording head according to claim 6, wherein during the forming of the main magnetic pole, the tilt angle θ1 is within a range of from 2 to 5°.

8. The method of manufacturing a perpendicular magnetic recording head according to claim 7, wherein during the forming of the main magnetic pole, the tilt angle θ1 is within a range of from 3 to 5°.

9. The method of manufacturing a perpendicular magnetic recording head according to claim 5, wherein during the forming of the main magnetic pole, the main magnetic pole is formed by a sputtering method.

10. The method of manufacturing a perpendicular magnetic recording head according to claim 5, wherein during the forming of the main magnetic pole, after the main magnetic pole is formed by plating, a top surface of the main magnetic pole is etched in an inclined direction and the inclined surface is then formed.

* * * * *